US009383193B2

United States Patent
Fujita et al.

(10) Patent No.: US 9,383,193 B2
(45) Date of Patent: Jul. 5, 2016

(54) OPTICAL BEND MEASUREMENT APPARATUS

(71) Applicant: OLYMPUS CORPORATION, Shibuya-ku, Tokyo (JP)

(72) Inventors: Hiromasa Fujita, Hachioji (JP); Eiji Yamamoto, Musashimurayama (JP)

(73) Assignee: OLYMPUS CORPORATION, Tokyo (JP)

( * ) Notice: Subject to any disclaimer, the term of this patent is extended or adjusted under 35 U.S.C. 154(b) by 0 days.

(21) Appl. No.: 14/842,031

(22) Filed: Sep. 1, 2015

(65) Prior Publication Data

US 2015/0369592 A1    Dec. 24, 2015

Related U.S. Application Data

(63) Continuation of application No. 14/046,015, filed on Oct. 4, 2013, now Pat. No. 9,146,097, which is a continuation of application No. PCT/JP2012/059250, filed on Apr. 4, 2012.

(30) Foreign Application Priority Data

Apr. 5, 2011 (JP) .................................. 2011-083583

(51) Int. Cl.
*G01B 11/24* (2006.01)
*G02B 6/00* (2006.01)
(Continued)

(52) U.S. Cl.
CPC ............... *G01B 11/24* (2013.01); *G01B 11/18* (2013.01); *G01D 5/35338* (2013.01); *G02B 6/02052* (2013.01)

(58) Field of Classification Search
CPC ............. G01N 21/7703; G01D 5/353; G01D 5/35383; G01D 5/268; G01H 9/004
USPC ............................................ 385/12; 356/601
See application file for complete search history.

(56) References Cited

U.S. PATENT DOCUMENTS

2004/0165810 A1*  8/2004  Fujita ................... A61B 1/0055
                                                          385/12

FOREIGN PATENT DOCUMENTS

JP        57-141604 A      9/1982
JP        09-072720 A      3/1997
(Continued)

OTHER PUBLICATIONS

Japanese Office Action dated Dec. 2, 2014 from related Japanese Patent Application No. 2011-083583, together with an English language translation.
(Continued)

*Primary Examiner* — Jerry Blevins
(74) *Attorney, Agent, or Firm* — Scully, Scott, Murphy & Presser, P.C.

(57) ABSTRACT

An optical bend measurement apparatus includes a light source unit configured to supply measurement light, an optical transmission body configured to transmit the measurement light, a optical characteristic change members provided in different portions of the optical transmission body, and a photodetection unit configured to detect light output from the optical transmission body. Each optical characteristic change member imposes a change of optical characteristics on light impinging on the optical characteristic change member depending on a bend quantity in a specific direction of a portion of the optical transmission body where the optical characteristic change member is provided. The photodetection unit separates and detects the light that has undergone the change of the optical characteristics to independently measure bend quantities in specific directions of the different portions of the optical transmission bodies based on intensities of the detected light.

20 Claims, 12 Drawing Sheets

(51) Int. Cl.
*G01B 11/16* (2006.01)
*G01D 5/353* (2006.01)
*G02B 6/02* (2006.01)

(56) References Cited

FOREIGN PATENT DOCUMENTS

| JP | 2001-66118 A | 3/2001 |
|---|---|---|
| JP | 2003-75133 A | 3/2003 |
| JP | 2003-156367 A | 5/2003 |
| JP | 2004-251779 A | 9/2004 |
| JP | 2006-010449 A | 1/2006 |
| JP | 2006-138757 A | 6/2006 |
| JP | 2007-24527 A | 2/2007 |
| JP | 2007-143600 A | 6/2007 |
| JP | 2011-500162 A | 1/2011 |
| WO | 20101140440 A1 | 12/2010 |

OTHER PUBLICATIONS

Japanese Office Action dated Jun. 30, 2015 from related Japanese Patent Application No. 2011-083583, together with an English language translation.

International Search Report dated May 22, 2012 issued in PCT/JP2012/059250.

U.S. Office Action dated Jan. 7, 2015 in related U.S. Appl. No. 14/046,015.

* cited by examiner

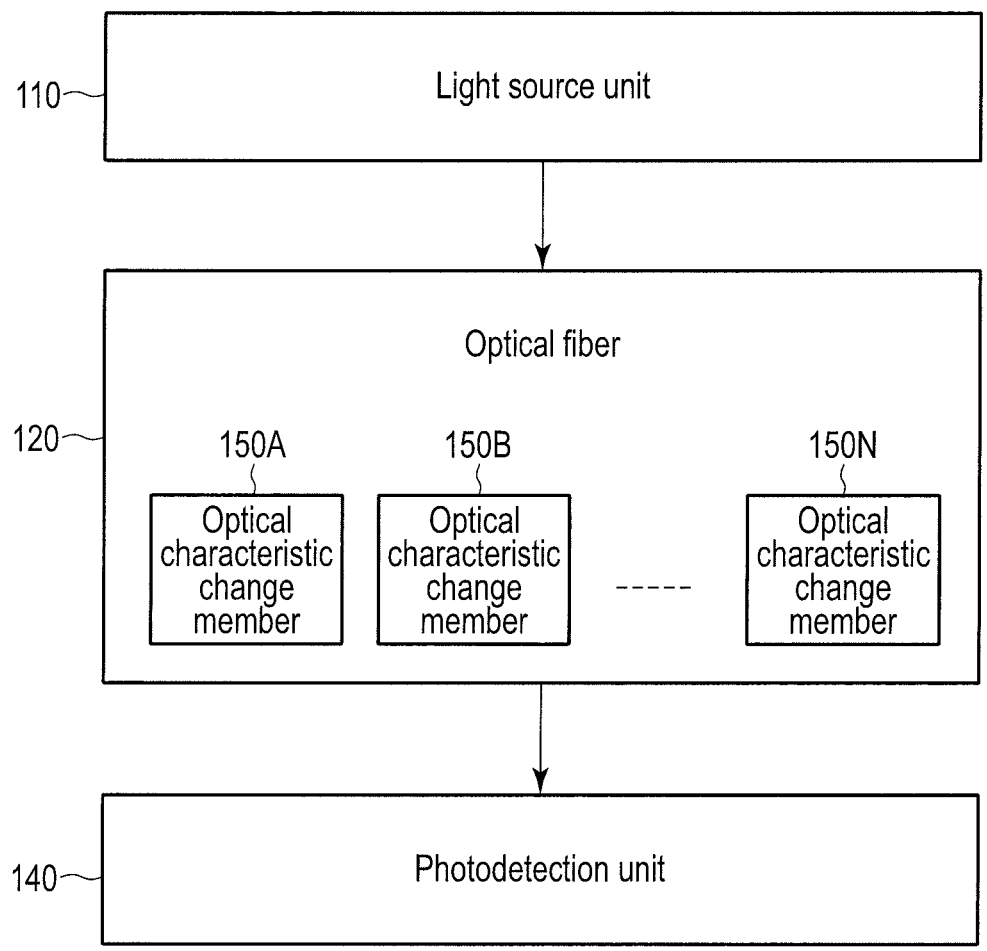
F I G. 1

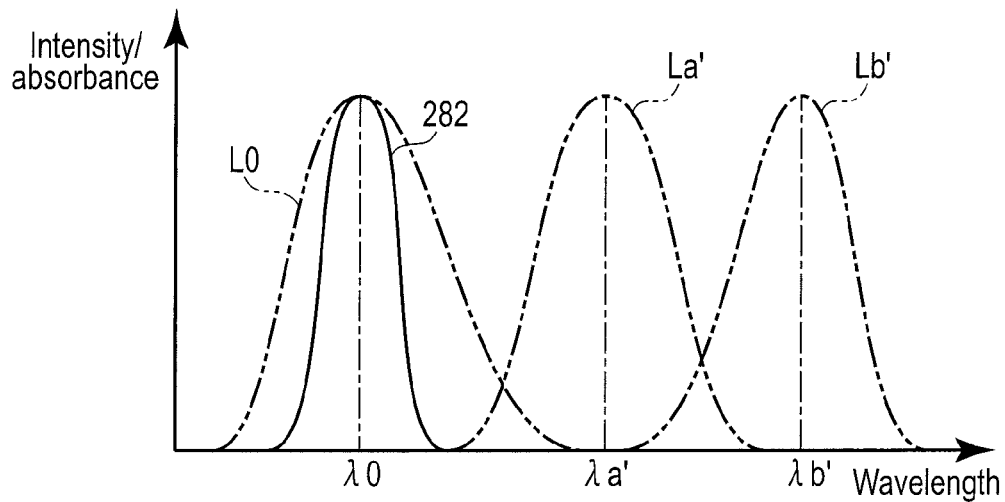
F I G. 8
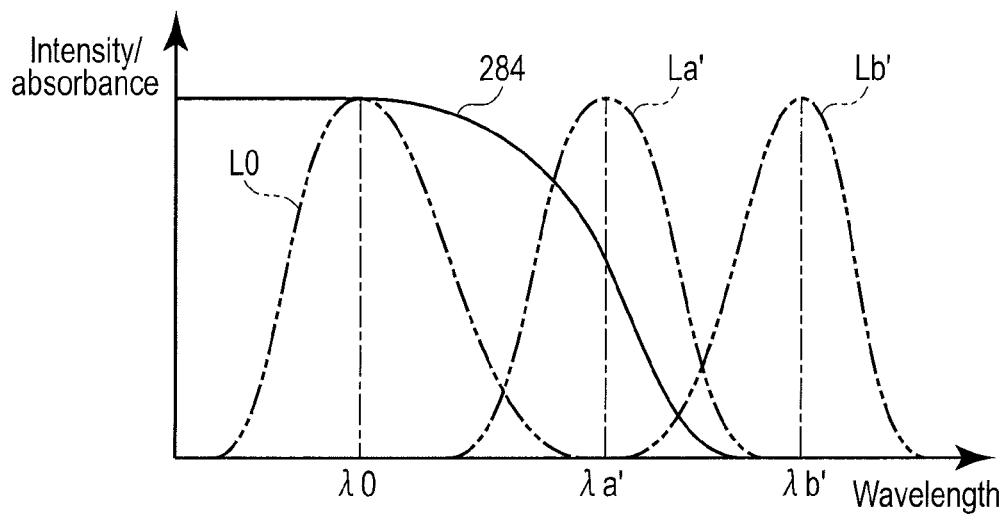
F I G. 9

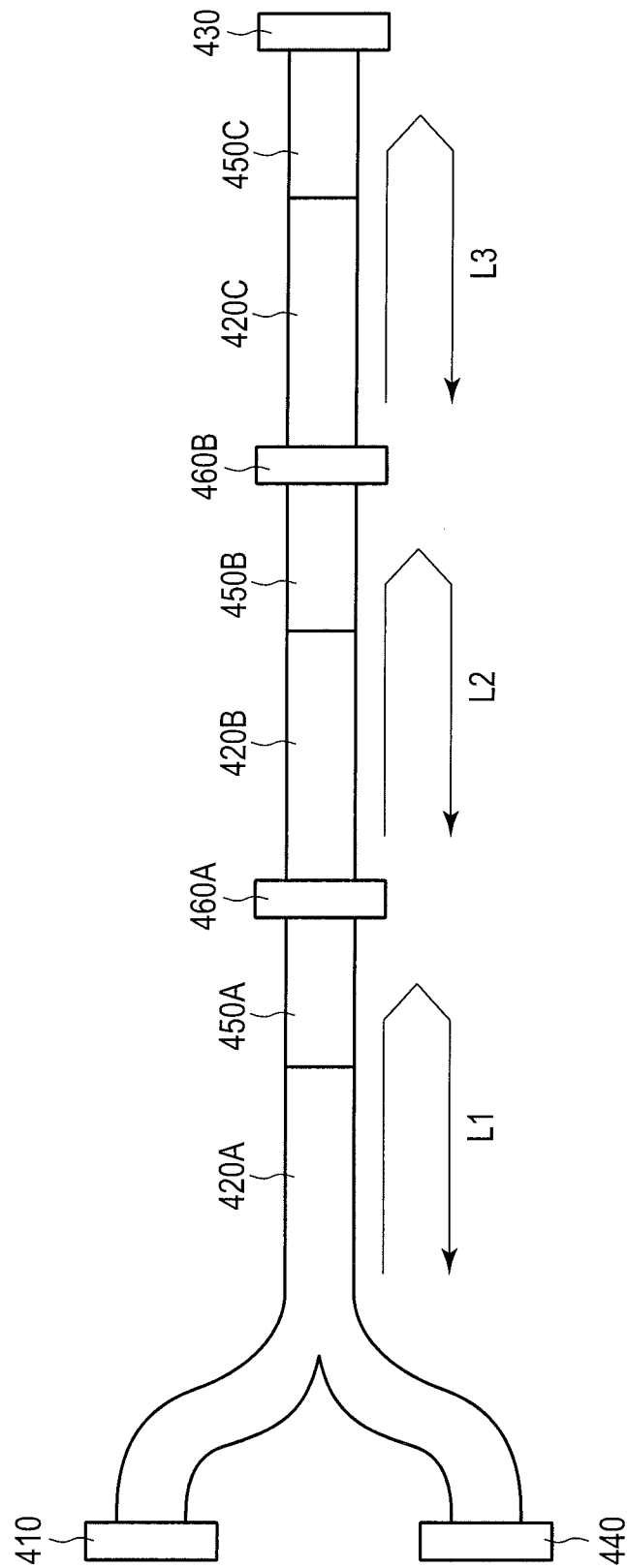
F I G. 14

OPTICAL BEND MEASUREMENT APPARATUS

CROSS-REFERENCE TO RELATED APPLICATIONS

This application is a Continuation Application of U.S. patent application Ser. No. 14/046,015, filed Oct. 4, 2013, which is a Continuation Application of PCT Application No. PCT/JP2012/059250, filed Apr. 4, 2012 and based upon and claiming the benefit of priority from prior Japanese Patent Application No. 2011-083583, filed Apr. 5, 2011, the entire contents of all of which are incorporated herein by reference.

BACKGROUND OF THE INVENTION

1. Field of the Invention

The present invention relates to an optical bend measurement apparatus.

2. Description of the Related Art

FIGS. 16 to 18 show a curvature measurement apparatus using an optical fiber, which is disclosed in Jpn. Pat. Appln. KOKAI Publication No. 57-141604. FIG. 16 shows the state of the optical fiber before bending in the curvature measurement apparatus. FIG. 17 shows the state of the optical fiber during bending in the curvature measurement apparatus.

The optical fiber has a core portion 501 made of glass, transparent plastic, or the like. Part of the outer circumferential surface of the core portion 501 is covered by a light absorber 503, and the remaining part is covered by a cladding portion 502. Light impinging on the interface between the core portion 501 and the cladding portion 502 at an angle larger than the total reflection angle is totally reflected at the interface.

Light propagates through such optical fiber as follows. That is, in the state before bending shown in FIG. 16, a light ray 504 traveling parallel to the inner wall is transmitted. In light traveling not parallel to the inner wall, a light ray 505 impinging on the light absorber 503 is absorbed by the light absorber 503, and thus is not transmitted. Light not impinging on the light absorber 503 upon entering at a small angle like a light ray 506 is transmitted without being absorbed.

In the state during bending shown in FIG. 17, since light travels straight, all the light rays 504, 505, and 506 impinge the light absorber 503, are absorbed by the light absorber 503, and thus are not transmitted.

FIG. 18 shows a case in which such curvature measurement apparatus is applied to bend measurement of a rail of a railway. An optical fiber bundle 509 is arranged along a rail 508 of the railway, one end portion of the optical fiber bundle 509 is connected with a laser light source 510 and the other end portion is connected with a photoelectric conversion apparatus 511.

The optical fiber bundle 509 is formed from three optical fibers each including a light absorber 503 in correspondence with one of three measurement locations of the rail 508. The light absorbers 503 of the optical fibers are arranged at the measurement locations, respectively. The attenuation quantity of light transmitted through each of the three optical fibers is measured, thereby obtaining the curvature at a corresponding one of the three measurement locations.

One optical fiber may be used for measurement, instead of using the three optical fibers. In this case, the light absorber 503 is moved along the rail 508 to perform measurement three times, thereby obtaining a similar result. Alternatively, three absorbers 503 may be provided on an optical fiber at three locations. In this case, the attenuation quantity of light is obtained as the product of light attenuation quantities at the three locations.

As described above, the conventional curvature measurement apparatus measures the curvature of the rail or the degree of depression of the rail during train passage by measuring the attenuation quantity of light.

In the above-described conventional apparatus, a curvature obtained through a single optical fiber is a value at a location or the product of values at locations. To obtain individual values at locations, it is necessary to repeatedly lay a single optical fiber and perform measurement, or to lay optical fibers and perform measurement.

Such method is applicable if the volume presents no problem when laying optical fibers, for example, if the measurement target is a rail. However, such method cannot be adopted if it is difficult to lay optical fibers in a measurement target in terms of volume, or if it is difficult to change the laying conditions. Furthermore, the conventional apparatus cannot obtain curvatures at locations as individual values using a single optical fiber.

BRIEF SUMMARY OF THE INVENTION

The present invention has been made in consideration of the aforementioned actual circumstances, and its object is to provide an optical bend measurement apparatus that is applicable to a measurement target in which it is difficult to lay optical fibers, and can independently measure bend quantities in specific directions at locations of the measurement target.

An optical bend measurement apparatus includes a light source unit configured to supply measurement light, an optical transmission body configured to transmit the measurement light, a optical characteristic change members provided in different portions of the optical transmission body, and a photodetection unit configured to detect light output from the optical transmission body. Each optical characteristic change member imposes a change of optical characteristics on light impinging on the optical characteristic change member depending on a bend quantity in a specific direction of a portion of the optical transmission body where the optical characteristic change member is provided. The photodetection unit separates and detects the light that has undergone the change of the optical characteristics to independently measure bend quantities in specific directions of the different portions of the optical transmission bodies based on intensities of the detected light.

Advantages of the invention will be set forth in the description which follows, and in part will be obvious from the description, or may be learned by practice of the invention. The advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate embodiments of the invention, and together with the general description given above and the detailed description of the embodiments given below, serve to explain the principles of the invention.

FIG. 1 is a block diagram showing the schematic arrangement of an optical bend measurement apparatus according to the first embodiment.

FIG. 8 is a graph showing suitable absorption characteristics for the optical characteristic change member.

FIG. 9 is a graph showing unsuitable absorption characteristics for the optical characteristic change member.

FIG. 14 is a view showing the schematic arrangement of an optical bend measurement apparatus according to the fourth embodiment.

DETAILED DESCRIPTION OF THE INVENTION

Figure 2:
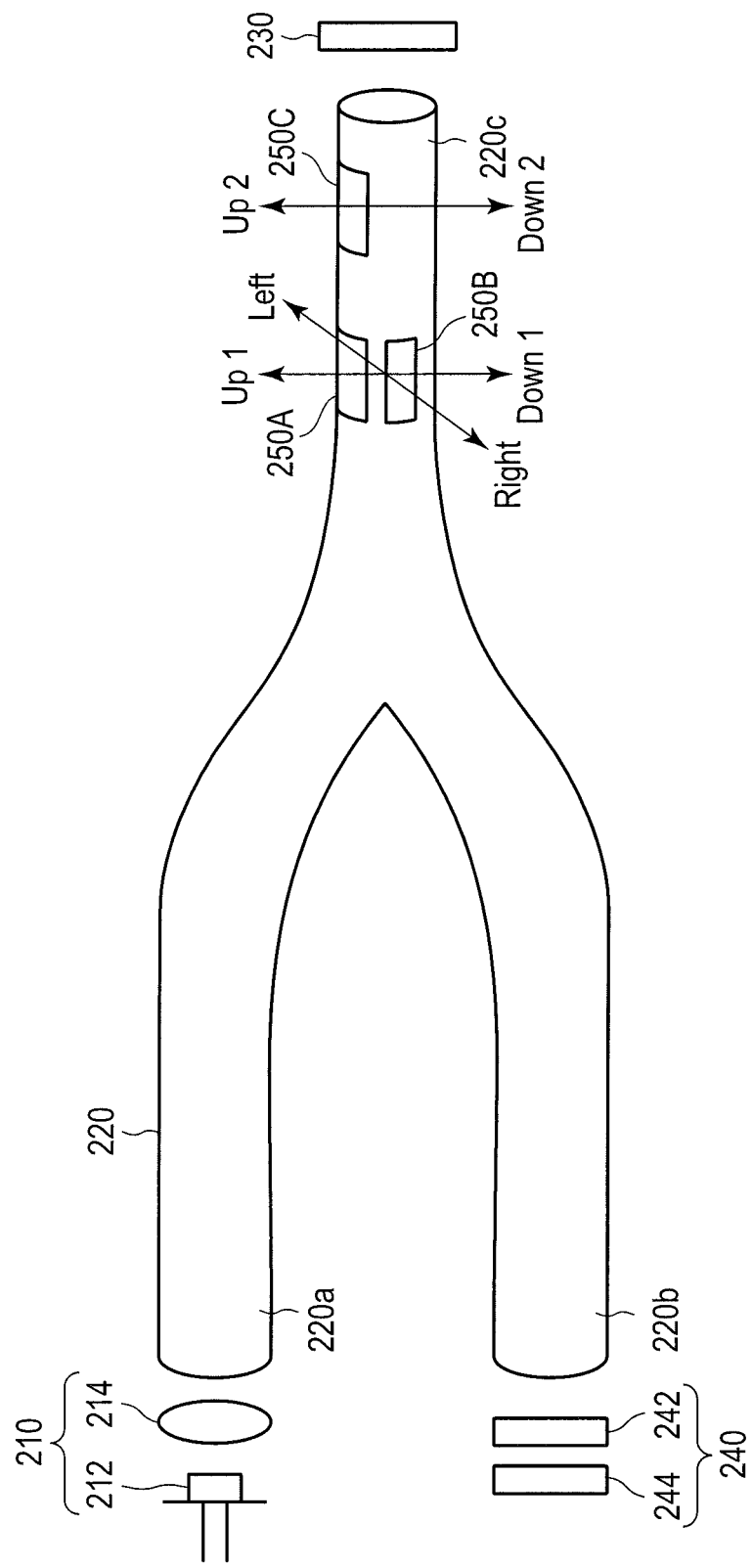
FIG. 2 is a view showing the schematic arrangement of an optical bend measurement apparatus according to the second embodiment.

Embodiments of the present invention will be described below with reference to the accompanying drawings.

First Embodiment

FIG. 1 shows the schematic arrangement of an optical bend measurement apparatus according to the first embodiment. As shown in FIG. 1, the optical bend measurement apparatus includes a light source unit 110 for supplying measurement light, an optical transmission body, for example, an optical fiber 120, for transmitting the measurement light, optical characteristic change members 150A, 150B, ..., 150N provided in different portions of the optical fiber 120, and a photodetection unit 140 for detecting light output from the optical fiber 120.

Each of the optical characteristic change members 150A, 150B, ..., 150N imposes a change of the optical characteristics on light impinging on it depending on the bend quantity in a specific direction of the portion of the optical fiber 120 where it is provided. Furthermore, light components on which the optical characteristic change members 150A, 150B, ..., 150N impose changes of optical characteristics, respectively are different from each other. For example, the optical characteristic change members 150A, 150B, ..., 150N impose the changes of the optical characteristics on light components of wavelengths $\lambda a, \lambda b, \ldots, \lambda n$, respectively. That is, the changes of the optical characteristics imposed by the optical characteristic change members 150A, 150B, ..., 150N are independent of each other. The changes of the optical characteristics are changes that the optical characteristic change members 150A, 150B, ..., 150N impose on light impinging on them. As a result, the impinging light is individually identifiable.

The photodetection unit 140 separates and detects the light for each light component that has undergone the change of the optical characteristics by each of the optical characteristic change members 150A, 150B, ..., 150N, to independently measures, based on the intensities of the light components, the bend quantities in specific directions of the portions of the optical fiber 120 where the optical characteristic change members 150A, 150B, ..., 150N are provided. Detection by the photodetection unit 140 is performed after changing the way of propagation through reflection or transmission of light via the optical characteristic change members 150A, 150B, ..., 150N.

In one example, for example, the optical characteristic change members 150A, 150B, ..., 150N are provided at different positions in the extending direction or longitudinal direction of the optical fiber 120. Note that the extending direction or longitudinal direction of the optical fiber 120 indicates a direction along the path of light propagating through the optical fiber 120. The term "extending direction" or "longitudinal direction" has the same meaning also in a description of embodiments to be provided later. In this case, the photodetection unit 140 can measure a bend quantity in a specific direction at each of the different positions in the extending direction or longitudinal direction of the optical fiber 120. The specific directions at the respective positions may be identical or different.

In another example, the optical characteristic change members 150A, 150B, ..., 150N are provided at different positions in the circumferential direction at the same position in the extending direction or longitudinal direction of the optical fiber 120. Note that the circumferential direction of the optical fiber 120 indicates, in a cross section (for example, vertical) of the propagation path of light, a direction along the outer circumferential surface of the optical fiber 120. The term "circumferential direction" has the same meaning also in a description of the embodiments to be provided later. In this case, the photodetection unit 140 can measure a bend direction and bend quantity at one position in the extending direction or longitudinal direction of the optical fiber 120.

The aforementioned two examples may be combined, as a matter of course. That is, some of the optical characteristic change members 150A, 150B, ..., 150N may be provided at different positions in the extending direction or longitudinal direction of the optical fiber 120, and others may be provided at different positions in the circumferential direction of the optical fiber 120.

Since the optical bend measurement apparatus according to this embodiment has the aforementioned arrangement, it can measure bend quantities in specific directions at locations of a measurement target, for example, a bend direction at a specific point and bend quantities at locations, even for, for example, a narrow pipe or confined area in which only one optical fiber can be laid.

Second Embodiment

FIG. 2 shows the schematic arrangement of an optical bend measurement apparatus according to the second embodiment. As shown in FIG. 2, the optical bend measurement apparatus includes a light source unit 210 for supplying measurement light, an optical transmission body, for example, an optical fiber 220, for transmitting the measurement light, a reflecting member 230 for reflecting light emerging from the optical fiber 220 to return it to the optical fiber 220, optical characteristic change members 250A, 250B, and 250C provided in different portions of the optical fiber 220, and a photodetection unit 240 for detecting light output from the optical fiber 220.

The light source unit 210 includes a light source 212 such as an LED (light emitting diode) or LD (laser diode), and an optical member 214 such as a convex lens for improving the efficiency of light to enter the optical fiber.

The optical fiber 220 has a Y branch structure with two end portions 220a and 220b on one side and one end portion 220c on the opposite side. For example, the optical fiber 220 is constituted from a Y branch fiber with a 1:1 light quantity ratio. The end portion 220a is optically coupled to the light source unit 210, and receives light supplied by the light source unit 210. The end portion 220b is optically coupled to the photodetection unit 240, which receives light output from the end portion 220b. The end portion 220c is optically coupled to the reflecting member 230, which reflects light output from the end portion 220c to return it to the end portion 220c.

The optical characteristic change members 250A and 250B are arranged at the same position in the extending direction or longitudinal direction of the optical fiber 220. Furthermore, the optical characteristic change members 250A and 250B are arranged at different positions in the circumferential direction. For example, the optical characteristic change members 250A and 250B are arranged at positions different by 90 degrees about the central axis. Note that the central axis indicates an imaginary line extending along the center of the propagation path of light.

The optical characteristic change members 250A and 250C are arranged at different positions in the extending direction or longitudinal direction of the optical fiber 220 and at different positions in the circumferential direction.

Although FIG. 2 shows a case in which the three optical characteristic change members 250A, 250B, and 250C are provided, the number of optical characteristic change members may be two or larger.

Each of the optical characteristic change members 250A, 250B, and 250C extends in the extending direction or longitudinal direction of the optical fiber 220, and imposes a change of the optical characteristics on light impinging on it depending on the bend quantity in a specific direction of the portion of the optical fiber 220 where it is provided. For example, each of the optical characteristic change members 250A and 250C imposes a change of the optical characteristics on light impinging on it depending on the bend quantity in the up/down direction of the portion of the optical fiber 220 where it is provided. The optical characteristic change member 250B imposes a change of the optical characteristics on light impinging on it depending on the bend quantity in the lateral direction of the portion of the optical fiber 220 where it is provided.

Light components on which the optical characteristic change members 250A, 250B, and 250C impose the change of the optical characteristics are different from each other. For example, the optical characteristic change members 250A, 250B, and 250C impose the changes of the optical characteristics on light components of wavelengths $\lambda a$, $\lambda b$, and $\lambda c$, respectively.

The photodetection unit 240 includes a separating optical element 242 for separating light output from the end portion 220b of the optical fiber 220 into light components that has undergone the change of the optical characteristics by the optical characteristic change members 250A, 250B, and 250C, respectively, and a photodetector 244 for detecting the intensities of the respective light components separated by the separating optical element 242.

In this arrangement, a Y branch fiber is used as the optical fiber 220. It is, however, possible to obtain the same effects even in an arrangement in which the photodetection unit 240 is arranged at the position of the reflecting member 230.

Figure 3:
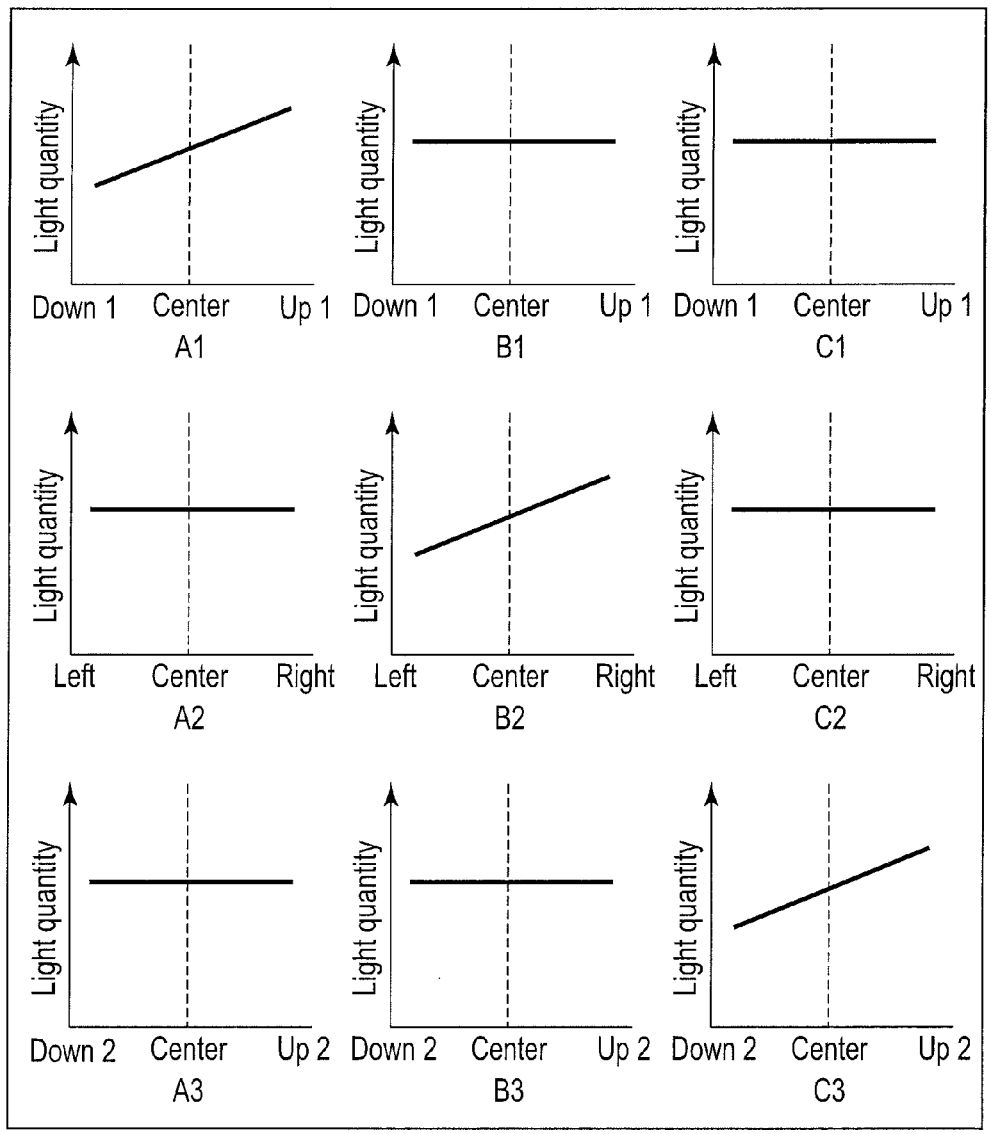
FIG. 3 is a view showing a change in intensity of each light component detected by a photodetection unit shown in FIG. 2.

FIG. 3 shows a change in intensity of each light component detected by the photodetection unit 240. Each of A1, B1, and C1 shows a change in intensity of light that has undergone the change of the optical characteristics by a corresponding one of the optical characteristic change members 250A, 250B, and 250C when the portion of the optical fiber 220 where the optical characteristic change members 250A and 250B are provided is bent in the up/down direction (up 1/down 1 direction). Each of A2, B2, and C2 shows a change in intensity of light that has undergone the change of the optical characteristics by a corresponding one of the optical characteristic change members 250A, 250B, and 250C when the portion of the optical fiber 220 where the optical characteristic change members 250A and 250B are provided is bent in the lateral direction. Furthermore, each of A3, B3, and C3 shows a change in intensity of light that has undergone the change of the optical characteristics by a corresponding one of the optical characteristic change members 250A, 250B, and 250C when the portion of the optical fiber 220 where the optical characteristic change member 250C is provided is bent in the up/down direction (up 2/down 2 direction).

As can be seen from FIG. 3, for example, when the portion of the optical fiber 220 where the optical characteristic change members 250A and 250B are provided is bent in the up/down direction, a change occurs in only the intensity of light that has undergone the change of the optical characteristics by the optical characteristic change member 250A, and no change occurs in the intensity of light that may undergo the change of the optical characteristics by the optical characteristic change member 250B or 250C. The photodetection unit 240 separates and detects light for each light component that has undergone the change of the optical characteristics by each of the optical characteristic change members 250A, 250B, and 250C. In this example, since a change occurs in only the intensity of the light that has undergone the change of the optical characteristics by the optical characteristic change member 250A, the photodetection unit 240 detects that the portion of the optical fiber 220 where the optical characteristic change member 250A is provided has been bent in the up/down direction, and measures the bend quantity based on the change quantity of the intensity of the light.

That is, the photodetection unit 240 separates and detects light for each light component that has undergone the change of the optical characteristics by each of the optical characteristic change members 250A, 250B, and 250C, and independently measures, based on the intensities of the detected light components, the bend quantities in specific directions of the portions of the optical fiber 220 where the optical characteristic change members 250A, 250B, and 250C are provided. For example, if changes occur in the intensities of the light components that has undergone the change of the optical characteristics by the optical characteristic change members 250A and 250B, the photodetection unit 240 measures a bend direction and bend quantity based on the ratio of the change quantities.

Examples of a change of optical characteristics imposed by the optical characteristic change member 250A, 250B, or 250C are as follows.

A first example is a decrease in light intensity by absorption of light by the optical characteristic change member 250A, 250B, or 250C. In this case, the optical characteristic change member 250A, 250B, or 250C is constituted from a light absorbing member for absorbing light of a different wavelength. The optical characteristic change member 250A, 250B, or 250C absorbs only light of a specific wavelength $\lambda a$, $\lambda b$, or $\lambda c$ depending on the bend quantity in a specific direction of the portion of the optical fiber where it is provided. As a result, if light propagates via the optical characteristic change member 250A, 250B, or 250C, the intensity of the light component of the corresponding wavelength decreases.

In this case, the light source unit 210 supplies a wide wavelength band light including light of wavelengths $\lambda a$, $\lambda b$, and $\lambda c$, for example, a white light. Or, the light source unit 210 supplies a composed light of the light of the wavelengths $\lambda a$, $\lambda b$, and $\lambda c$. Alternatively, the light source unit 210 time divisionally supplies the light of the wavelengths $\lambda a$, $\lambda b$, and $\lambda c$. For example, the light source unit 210 repeatedly supplies the light of the wavelengths $\lambda a$, $\lambda b$, and $\lambda c$ at time intervals ta, tb, and tc, respectively.

Furthermore, the separating optical element 242 of the photodetection unit 240 separates the light output from the optical fiber 220 into light of wavelengths $\lambda a$, $\lambda b$, and $\lambda c$, and the photodetector 244 detects the intensities of the light of the wavelengths $\lambda a$, $\lambda b$, and $\lambda c$, which have been separated by the separating optical element 242. For example, the photodetector 244 may be constituted from a line sensor as a chip integrating PDs, an area sensor such as a CCD, or the like. The present invention, however, is not limited to them. More preferably, the photodetector 244 is optically coated, which has effects such as a light condensing effect and antireflection effect. The separating optical element 242 may be constituted from, for example, an element having beam spectral characteristics such as a blaze mirror. If the light source unit 210 time divisionally supplies light, the separating optical element 242 may be constituted from an element to direct the light of the wavelengths $\lambda a$, $\lambda b$, and $\lambda c$ to different photoelectric conversion elements, respectively, by changing the angle of the mirror.

Figure 4:
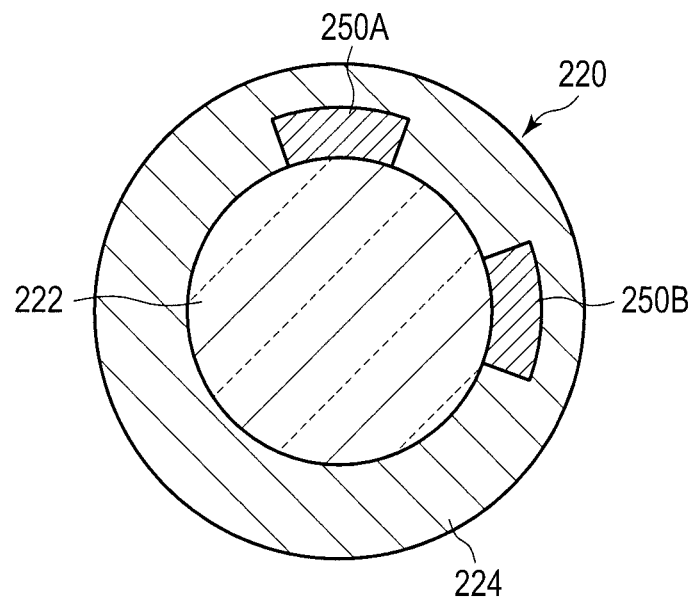
FIG. 4 is a view showing the sectional structure of part of an optical fiber in which optical characteristic change members shown in FIG. 2 are provided.

As shown in FIG. 4, for example, the optical fiber 220 includes a core 222 extending along the center, and a cladding 224 arranged around the core 222. The optical characteristic change members 250A and 250B are arranged in the cladding 224 so as to contact the core 222 of the optical fiber 220. FIG. 4 shows only the optical characteristic change members 250A and 250B, and does not show the optical characteristic change member 250C. However, the optical characteristic change member 250C is arranged in the same manner.

Figure 5:
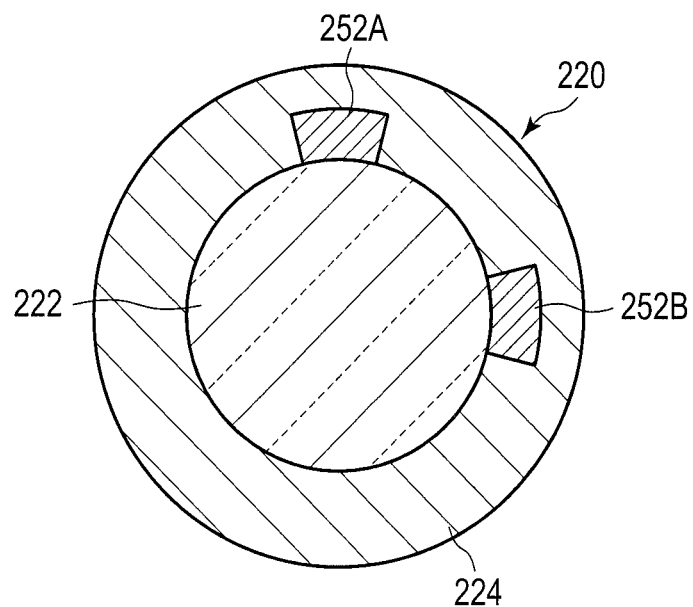
FIG. 5 is a view showing the sectional structure of an optical fiber in which other optical characteristic change members are provided instead of the optical characteristic change members shown in FIG. 4.

The arrangement of the optical characteristic change member may be optimized in a variety of forms. For example, in the arrangement in which two optical characteristic change members are arranged at two positions different by 90 degrees about the central axis of the optical fiber 220, instead of the optical characteristic change members 250A and 250B shown in FIG. 4, optical characteristic change members 252A and 252B with a circumferential length shorter than that of the optical characteristic change members shown in FIG. 4 may be provided, as shown in FIG. 5. In this case, the detection sensitivity of a bend quantity decreases but the detection sensitivity of a bend direction improves.

Figure 6:
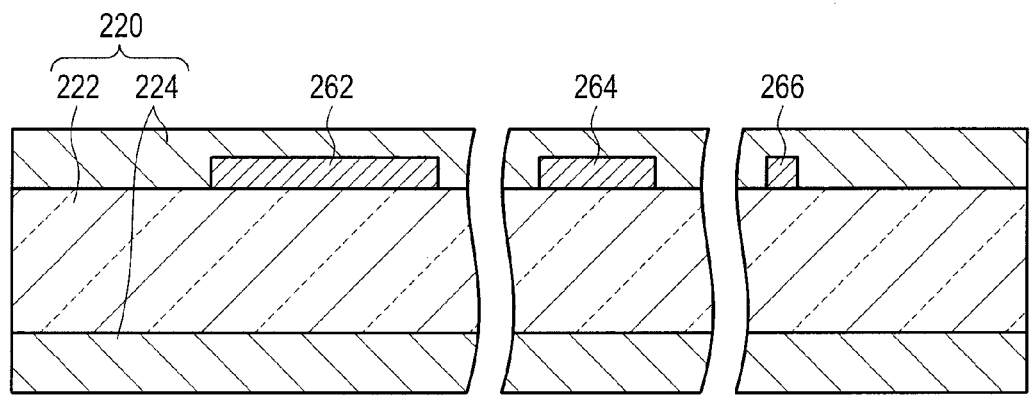
FIG. 6 is a view showing the sectional structure of an optical fiber in which optical characteristic change members having different lengths are provided.
Figure 7:
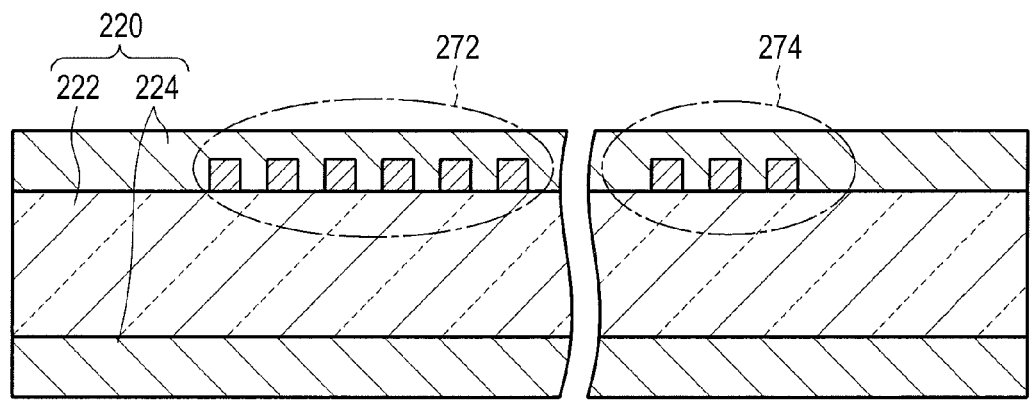
FIG. 7 is a view showing the sectional structure of an optical fiber in which optical characteristic change members each formed from elements are provided.

Furthermore, in consideration of differences in intensity between the light of different wavelengths to be supplied and differences in light absorbance between the materials of the respective optical characteristic change members, optical characteristic change members 262, 264, and 266 with different lengths in the longitudinal direction of the optical fiber 220 may be provided in the optical fiber 220, as shown in FIG. 6. Each optical characteristic change member need not be constituted from a single member. As shown in FIG. 7, optical characteristic change members 272 and 274 each constituted from elements may be provided in the optical fiber 220.

In addition, if it is only necessary to be able to measure bend quantities in two specific directions, it is also possible to perform detection using polarized light. In this case, light absorbing members are arranged at different positions in the circumferential direction of the optical fiber 220 that traverses the two bend directions, and the light source unit 210 supplies a linearly polarized light that is parallel to neither of the two bend directions. Each of the two bend direction components of the linearly polarized light is absorbed by the light absorbing member depending on the bend quantity of the portion of the optical fiber 220. The photodetection unit 240 separately detects the two bend direction components of the linearly polarized light, thereby independently measuring the bend quantities in the two directions of the optical fiber 220.

A second example of a change of optical characteristics imposed by the optical characteristic change members 250A, 250B, and 250C is wavelength conversion. In this case, the optical characteristic change members 250A, 250B, and 250C are constituted from wavelength conversion members, for example, phosphors, for converting impinging light into light of other wavelengths different from each other. The optical characteristic change members 250A, 250B, and 250C receive measurement light to generate light of wavelengths different from that of the measurement light. The optical characteristic change members 250A, 250B, and 250C may receive light of different wavelengths to generate light of different wavelengths, respectively, or may receive light of the same wavelength to generate light of different wavelengths, respectively. That is, the optical characteristic change members 250A, 250B, and 250C may receive light of the wavelengths $\lambda a$, $\lambda b$, and $\lambda c$ to generate light of wavelengths $\lambda a'$, $\lambda b'$, and $\lambda c'$, respectively, or may receive light of a wavelength $\lambda 0$ to generate light of the wavelengths $\lambda a'$, $\lambda b'$, and $\lambda c'$, respectively.

In this case, the light source unit 210 supplies a wide wavelength band light including light of the wavelengths $\lambda a$, $\lambda b$, and $\lambda c$, for example, a white light. Or, the light source unit 210 supplies a composed light of light of the wavelengths $\lambda a$, $\lambda b$, and $\lambda c$. Alternatively, the light source unit 210 time divisionally supplies light of the wavelengths $\lambda a$, $\lambda b$, and $\lambda c$. The light source unit 210 supplies light of the single wavelength $\lambda 0$ or light including the light of the wavelength.

Note that the light of the wavelength $\lambda a$, $\lambda b$, $\lambda c$, $\lambda a'$, $\lambda b'$, $\lambda c'$, or $\lambda 0$ indicates not light of a single wavelength but light having a wavelength spread with the wavelength as the center wavelength.

The optical characteristic change members 250A, 250B, and 250C have absorption characteristics that they do not absorb light (especially near the center wavelength) of the converted wavelengths λa', λb', and λc', respectively.

As an example, FIGS. 8 and 9 show suitable absorption characteristics and unsuitable absorption characteristics for the optical characteristic change member 250B together with light of the wavelengths λ0, λa', and λb'.

Since suitable absorption characteristics 282 for the optical characteristic change member 250B shown in FIG. 8 do not overlap light La' of the wavelength λa' generated by the optical characteristic change member 250A, the optical characteristic change member 250B absorbs light L0 of the wavelength λ0 to generate light Lb' of the wavelength λb' but never absorbs the light La' of the wavelength λa' to generate light Lb' of the wavelength λb'.

On the other hand, unsuitable absorption characteristics 284 for the optical characteristic change member 250B shown in FIG. 9 extend beyond the wavelength λa', and largely overlap the light La' of the wavelength λa' generated by the optical characteristic change member 250A. Therefore, in addition to absorbing the light L0 of the wavelength λ0 to generate the light Lb' of the wavelength λb', the optical characteristic change member 250B unwantedly absorbs the light La' of the wavelength λa' to generate the light Lb' of the wavelength λb'. As a result, it becomes difficult to accurately obtain the bend quantity of the optical characteristic change member 250A.

In this example, only the absorption characteristics of the optical characteristic change member 250B have been described. However, the same goes for the absorption characteristics of other optical characteristic change members 250A and 250C. That is, the absorption characteristics of each of the optical characteristic change members 250A, 250B, and 250C do not substantially overlap any of light of the wavelengths λa', λb', and λc'.

Furthermore, the photodetection unit 240 may have the arrangement applied to the optical characteristic change members 250A, 250B, and 250C each serving as a light absorbing member, except that the wavelengths of light to be detected are changed from λa, λb, and λc to λa', λb', and λc'.

The optical characteristic change members 250A, 250B, and 250C of the wavelength conversion members may be optimized by the method described with reference to FIGS. 5 to 7, similarly to the optical characteristic change members 250A, 250B, and 250C of the light absorbing members.

Another example of a change of optical characteristics imposed by the optical characteristic change member 250A, 250B, or 250C may be a change in phase information. In this case, the optical characteristic change members 250A, 250B, and 250C respectively change the pieces of phase information of light of different wavelengths depending on the bend quantities in specific directions of the portions of the optical fiber where the optical characteristic change members are provided.

Figure 10:
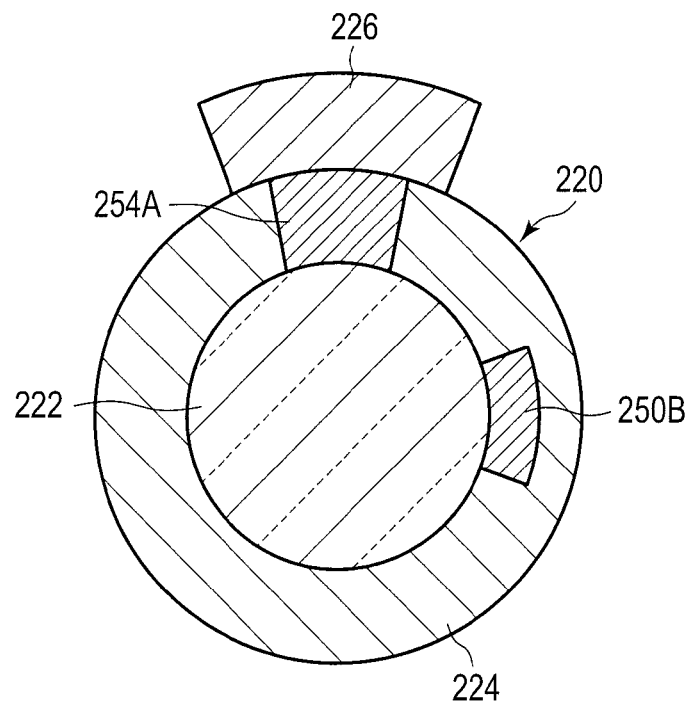
FIG. 10 is a view showing the sectional structure of an optical fiber in which optical characteristic change members are provided in another topology, instead of the optical characteristic change members shown in FIG. 4.
Figure 11:
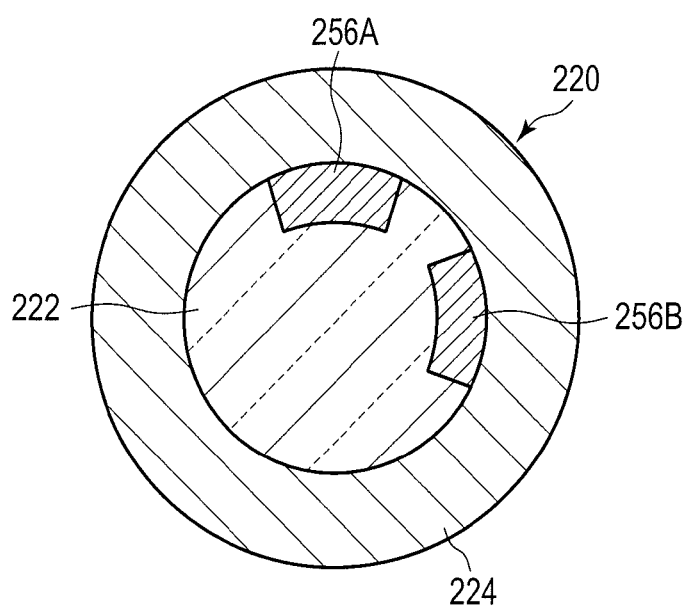
FIG. 11 is a view showing the sectional structure of an optical fiber in which optical characteristic change members are provided in still another topology, instead of the optical characteristic change members shown in FIG. 4.
Figure 12:
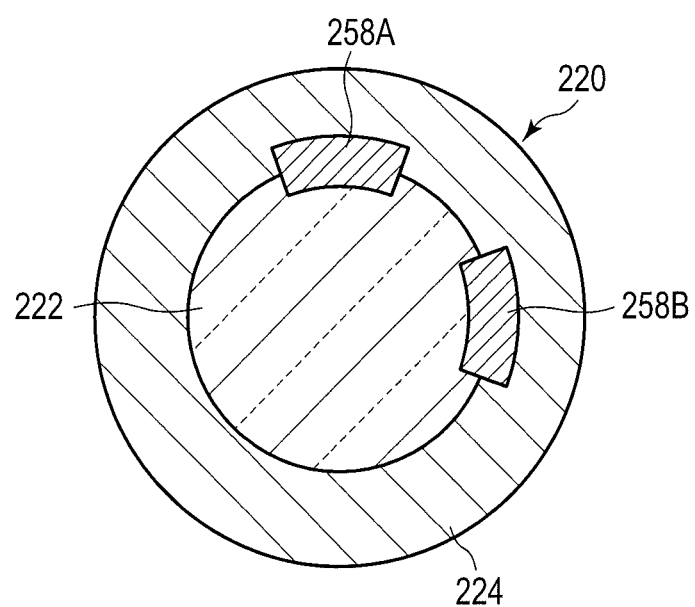
FIG. 12 is a view showing the sectional structure of an optical fiber in which optical characteristic change members are provided in still another topology, instead of the optical characteristic change members shown in FIG. 4.

FIG. 4 shows a case in which the optical characteristic change members 250A, 250B, and 250C are arranged in the cladding 224 of the optical fiber 220. The topology of the optical characteristic change members 250A, 250B, and 250C is not limited to this, and need only have a similar structure, and various other topologies may be applied. FIGS. 10 to 12 respectively show other topologies. In an example shown in FIG. 10, an optical characteristic change member 254A has a thickness equal to or larger than that of the cladding 224, and an auxiliary layer 226 of the cladding 224 may be provided outside the optical characteristic change member 254A. If the air functions as the auxiliary layer 226, the auxiliary layer 226 may be omitted. In an example shown in FIG. 11, optical characteristic change members 256A and 256B are arranged in the core 222 so as to contact the cladding 224 of the optical fiber 220. In an example shown in FIG. 12, optical characteristic change members 258A and 258B are arranged across the core 222 and cladding 224 of the optical fiber 220.

Since the optical bend measurement apparatus according to this embodiment has the aforementioned arrangement, it can measure bend quantities in specific directions at locations of a measurement target, for example, a bend direction at a specific point and bend quantities at locations, even for, for example, a narrow pipe or confined area in which only one optical fiber can be laid.

Third Embodiment

Figure 13:
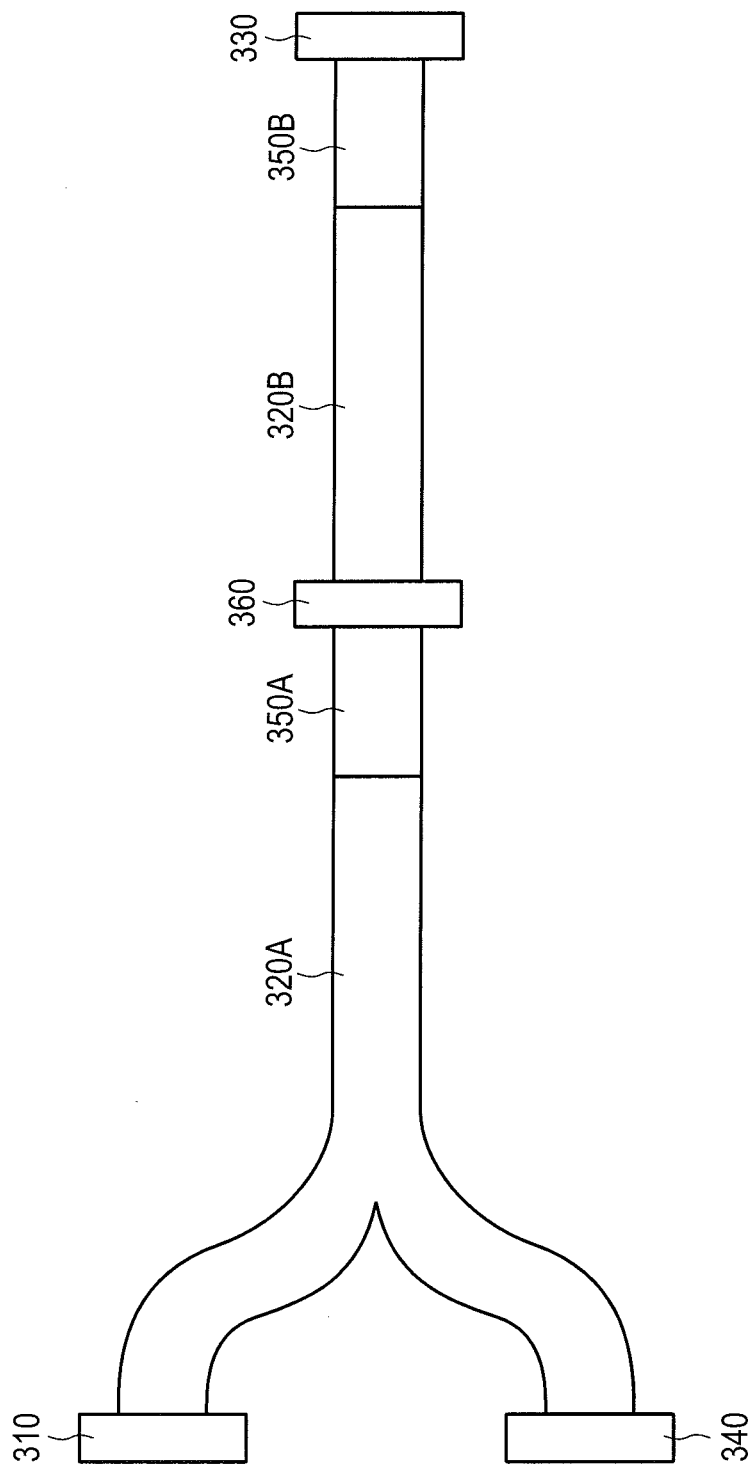
FIG. 13 is a view showing the schematic arrangement of an optical bend measurement apparatus according to the third embodiment.

FIG. 13 shows the schematic arrangement of an optical bend measurement apparatus according to the third embodiment. As shown in FIG. 13, the optical bend measurement apparatus includes a light source unit 310 for supplying measurement light, optical transmission bodies, for example, optical fibers 320A and 320B, for transmitting the measurement light, a reflecting member 330 for reflecting light rays emerging from the optical fibers 320A and 320B to return them to the optical fibers 320A and 320B, respectively, optical characteristic change members 350A and 350B provided in different portions of the optical fibers 320A and 320B, and a photodetection unit 340 for detecting light rays output from the optical fibers 320A and 320B.

The optical fiber 320A has a Y branch structure and the optical fiber 320B has a non branched structure. The optical characteristic change member 350A is arranged between the optical fiber 320A having the Y branch structure and the optical fiber 320B having the non branched structure. The optical characteristic change member 350B is arranged between the reflecting member 330 and the optical fiber 320B having the non branched structure.

The optical bend measurement apparatus further includes a reflection transmission member 360 arranged between the optical fiber 320B having the non branched structure and the optical characteristic change member 350A positioned on the side of the optical fiber 320A having the Y branch structure with respect to the optical fiber 320B. The reflection transmission member 360 reflects light that has undergone the change of the optical characteristics by the optical characteristic change member 350A positioned on the side of the optical fiber 320A having the Y branch structure with respect to the reflection transmission member 360, and transmits light that may undergo the change of the optical characteristics by the optical characteristic change member 350B positioned on the side of the reflecting member 330 with respect to the reflection transmission member 360.

The optical fiber 320A having the Y branch structure and the optical fiber 320B having the non branched structure are connected to each other via the optical characteristic change member 350A and reflection transmission member 360. Furthermore, the optical fiber 320B having the non branched structure and the reflecting member 330 are connected to each other via the optical characteristic change member 350B.

The arrangement of the optical fiber 320A having the Y branch structure is the same as that of the optical fiber 220 according to the second embodiment. The arrangement of the light source unit 310 is the same as that of the light source unit 210 according to the second embodiment, and the arrangement of the photodetection unit 340 is the same as that of the photodetection unit 240 according to the second embodiment. Furthermore, the relationship between the optical fiber 320A having the Y branch structure and the light source unit 310 and photodetection unit 340 is the same as that in the second embodiment. That is, one end portion of the optical fiber 320A having the Y branch structure is optically coupled to the light source unit 310, and another end portion is optically coupled to the photodetection unit 340. The remaining one end portion is optically coupled to the reflecting member 330 via the optical characteristic change member 350A, reflection transmission member 360, optical fiber 320B having the non branched structure, and the optical characteristic change member 350B.

For example, each of the optical characteristic change members 350A and 350B is constituted from a light absorbing member. The light source unit 310 supplies light of wavelengths $\lambda a$ and $\lambda b$, or light including the light of the wavelengths. The optical characteristic change members 350A and 350B absorb the light of the wavelengths $\lambda a$ and $\lambda b$ depending on the bend quantities of themselves, respectively. As a result, the intensities of the light of the wavelengths $\lambda a$ and $\lambda b$ decrease. The light of the wavelength $\lambda a$ is reflected by the reflection transmission member 360 toward the photodetection unit 340. The light of the wavelength $\lambda b$ is reflected by the reflecting member 330 toward the photodetection unit 340. Using the method described in the second embodiment, the photodetection unit 340 separately detects the light of the wavelengths $\lambda a$ and $\lambda b$, and independently measures the bend quantities of the optical characteristic change members 350A and 350B.

Alternatively, each of the optical characteristic change members 350A and 350B may be constituted from a wavelength conversion member. In this case, for example, the light source unit 310 supplies light of the wavelengths $\lambda a$ and $\lambda b$ or light including the light of the wavelengths, and the optical characteristic change members 350A and 350B generate light of wavelengths $\lambda a'$ and $\lambda b'$ depending on the bend quantities of themselves, respectively. Alternatively, the light source unit 310 may supply light of a wavelength $\lambda 0$ or light including the light of the wavelength, and the optical characteristic change members 350A and 350B generate light of the wavelengths $\lambda a'$ and $\lambda b'$ depending on the bend quantities of themselves, respectively. The light of the wavelength $\lambda a'$ is reflected by the reflection transmission member 360 toward the photodetection unit 340. The light of the wavelength $\lambda b'$ is reflected by the reflecting member 330 toward the photodetection unit 340. Using the method described in the second embodiment, the photodetection unit 340 separately detects the light of the wavelengths $\lambda a'$ and $\lambda b'$, and independently measures the bend quantities of the optical characteristic change members 350A and 350B. In the example in which each of the optical characteristic change members 350A and 350B is constituted from a wavelength conversion member, the reflection transmission member 360 may be omitted.

Since the optical bend measurement apparatus according to this embodiment has the aforementioned arrangement, it can measure bend quantities in specific directions at locations of a measurement target, for example, a bend direction at a specific point and bend quantities at locations, even for, for example, a narrow pipe or confined area in which only one optical fiber can be laid.

Fourth Embodiment

FIG. 14 shows the schematic arrangement of an optical bend measurement apparatus according to the fourth embodiment. As shown in FIG. 14, the optical bend measurement apparatus includes a light source unit 410 for supplying measurement light, optical transmission bodies, for example, optical fibers 420A, 420B, and 420C, for transmitting the measurement light, a reflecting member 430 for reflecting light rays emerging from the optical fibers 420A, 420B, and 420C to return them to the optical fibers 420A, 420B, and 420C, respectively, optical characteristic change members 450A, 450B, and 450C provided in different portions of the optical fibers 420A, 420B, and 420C, and a photodetection unit 440 for detecting light rays output from the optical fibers 420A, 420B, and 420C.

The optical fiber 420A has a Y branch structure, and each of the optical fibers 420B and 420C has a non branched structure. The optical characteristic change member 450A is arranged between the optical fiber 420A having the Y branch structure and the optical fiber 420B having the non branched structure. The optical characteristic change member 450B is arranged between the optical fibers 420B and 420C each having the non branched structure. The optical characteristic change member 450C is arranged between the reflecting member 430 and the optical fiber 420C having the non branched structure.

The optical bend measurement apparatus further includes reflection transmission members 460A and 460B that are arranged between the optical fibers 420B and 420C each having the non branched structure and the optical characteristic change members 450A and 450B positioned on the side of the optical fiber 420A having the Y branch structure with respect to the corresponding optical fibers, respectively. Each of the reflection transmission members 460A and 460B partially reflects impinging light, and partially transmits the impinging light.

The optical fiber 420A having the Y branch structure and the optical fiber 420B having the non branched structure are connected to each other via the optical characteristic change member 450A and reflection transmission member 460A. The optical fibers 420B and 420C each having the non branched structure are connected to each other via the optical characteristic change member 450B and reflection transmission member 460B. Furthermore, the optical fiber 420C having the non branched structure and the reflecting member 430 are connected to each other via the optical characteristic change member 450C.

The arrangement of the optical fiber 420A having the Y branch structure is the same as that of the optical fiber 220 according to the second embodiment. One end portion of the optical fiber 420A having the Y branch structure is optically coupled to the light source unit 410, and another one end portion is optically coupled to the photodetection unit 440. Furthermore, the remaining one end portion is optically coupled to the reflecting member 430 via the optical characteristic change members 450A, 450B, and 450C, reflection transmission members 460A and 460B, and optical fibers 420B and 420C.

For example, the light source unit 410 supplies pulsed measurement light of a single wavelength. Each of the optical characteristic change members 450A, 450B, and 450C is constituted from a light absorbing member for absorbing the measurement light, and absorbs the measurement light depending on the bend quantity of itself. As a result, the intensity of the measurement light decreases. Part L1 of the measurement light supplied by the light source unit 410 is reflected by the reflection transmission member 460A toward the photodetection unit 440. Another part L2 of the measurement light passes through the reflection transmission member 460A, and is then reflected by the reflection transmission member 460B toward the photodetection unit 440. Still another part L3 of the measurement light passes through the reflection transmission members 460A and 460B, and is then reflected by the reflecting member 430 toward the photodetection unit 440.

The light rays reflected by the reflection transmission members 460A and 460B and reflecting member 430 respectively reach the photodetection unit 440 at different times. The photodetection unit 440 separately detects, based on the time, the light rays reflected by the reflection transmission members 460A and 460B and reflecting member 430, and independently measures the bend quantities of the optical characteristic change members 450A, 450B, and 450C.

Figure 15:
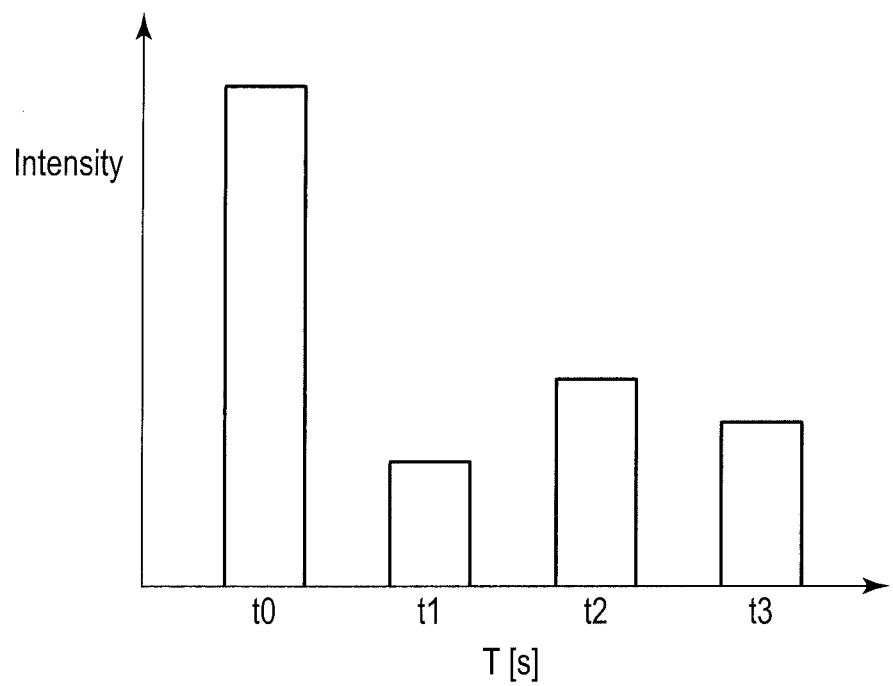
FIG. 15 is a graph showing the intensity of measurement light supplied at a time t0 and the intensities of light detected at times t1, t2, and t3.
Figure 16:
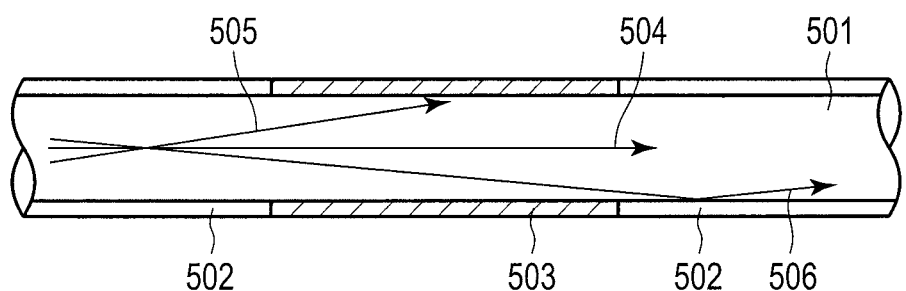
FIG. 16 is a view showing the state of an optical fiber before bending in a conventional curvature measurement apparatus.
Figure 17:
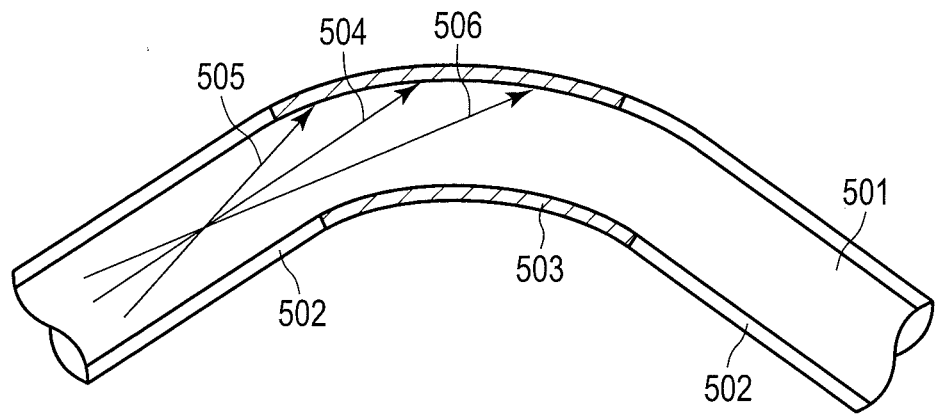
FIG. 17 is a view showing the state of the optical fiber during bending in the conventional curvature measurement apparatus.
Figure 18:
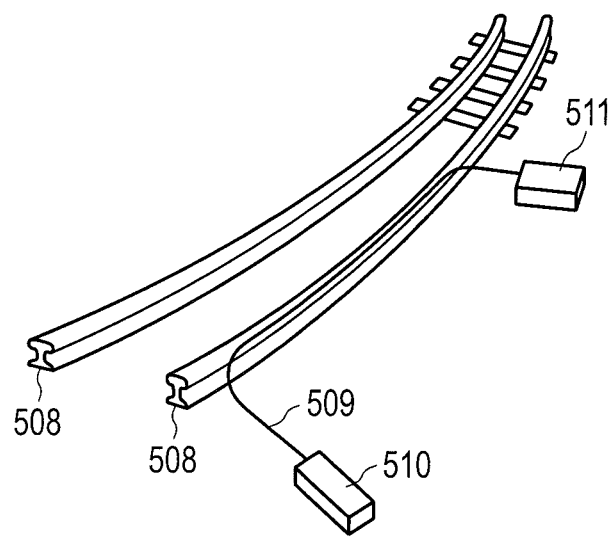
FIG. 18 is a view showing a use example of the conventional curvature measurement apparatus.

FIG. 15 shows the intensity of the measurement light supplied by the light source unit 410 at a time t0 and the intensities of the light rays detected by the photodetection unit 440 at times t1, t2, and t3. The photodetection unit 440 detects light reflected by the reflection transmission member 460A at the time t1, detects light reflected by the reflection transmission member 460B at the time t2, and detects light reflected by the reflecting member 430 at the time t3.

The photodetection unit 440 calculates the bend quantity of the optical characteristic change member 450A based on the intensity of the light detected at the time t1. The photodetection unit 440 also calculates the bend quantity of the optical characteristic change member 450B based on the intensity of the light detected at the time t2. At this time, the unit 440 removes the influence of the bend quantity of the optical characteristic change member 450A. Furthermore, the photodetection unit 440 calculates the bend quantity of the optical characteristic change member 450C based on the intensity of the light detected at the time t3. At this time, the unit 440 removes the influence of the bend quantities of the optical characteristic change member 450A and 450B.

Each of the optical characteristic change members 450A, 450B, and 450C may be constituted from a wavelength conversion member. In this case, the reflection transmission members 460A and 460B may be omitted.

Since the optical bend measurement apparatus according to this embodiment has the aforementioned arrangement, it can measure bend quantities in specific directions at locations of a measurement target, for example, a bend direction at a specific point and bend quantities at locations, even for, for example, a narrow pipe or confined area in which only one optical fiber can be laid. Furthermore, the photodetection unit 440 separately detects, based on the time, light rays that has undergone the change of the optical characteristics by the optical characteristic change members 450A, 450B, and 450C, respectively, requires no separating optical element, and thus can be configured at low cost.

The embodiments of the present invention have been described with reference to the accompanying drawings. The present invention, however, is not limited to them, and various modifications and changes may be made without departing from the spirit or scope of the invention. The various modifications and changes include appropriate combinations of the above described embodiments.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. An optical bend measurement apparatus comprising:
a light source unit configured to supply measurement light;
an optical fiber configured to transmit the measurement light;
an optical characteristic changer provided at a part of the length of the optical fiber, the optical characteristic changer including optical characteristic change members provided at different positions in the circumferential direction of the optical fiber; and
a photodetection unit configured to detect light output from the optical fiber,
each optical characteristic change member imposing a change of optical characteristics on light impinging on the optical characteristic change member depending on a bend quantity in a specific direction of a portion of the optical fiber where the optical characteristic change member is provided, and
the photodetection unit detecting the light that has undergone the change of the optical characteristics to independently measure bend quantities in specific directions of the different portions of the optical fiber based on intensities of the detected light;
wherein at least one of the optical characteristic change members is arranged in a cladding of the optical fiber.

2. The optical bend measurement apparatus according to claim 1, wherein the change of optical characteristics is a change imposed to the impinging light by each optical characteristic change member so that the impinging light becomes individually identifiable.

3. The optical bend measurement apparatus according to claim 1, wherein detection by the photodetection unit is performed after changing a way of propagation through one of reflection and transmission of light that has gone through the optical characteristic change members.

4. The optical bend measurement apparatus according to claim 1, wherein the optical characteristic change members absorb light of different wavelengths, respectively.

5. The optical bend measurement apparatus according to claim 1, wherein the optical characteristic change members convert the impinging light into light of wavelengths different from each other, respectively, and do not absorb the light of the converted wavelengths.

6. The optical bend measurement apparatus according to claim 1, wherein the light source unit supplies a wide wavelength band light including light components of wavelengths on which the optical characteristic change members impose changes of optical characteristics, respectively.

7. The optical bend measurement apparatus according to claim 1, wherein the light source unit supplies a composed light of light of wavelengths on which the optical characteristic change members impose changes of optical characteristics, respectively.

8. The optical bend measurement apparatus according to claim 1, wherein the light source unit time divisionally supplies light of wavelengths on which the optical characteristic change members impose changes of optical characteristics, respectively.

9. The optical bend measurement apparatus according to claim 1, wherein the photodetection unit includes a separating optical element configured to separate light output from the optical transmission body into light of wavelengths, and a photodetector configured to detect intensities of the light of the wavelengths separated by the separating optical element.

10. The optical bend measurement apparatus according to claim 1, wherein the at least one of the optical characteristic change members has a thickness equal to or larger than that of the cladding of the optical fiber.

11. The optical bend measurement apparatus according to claim 1, wherein the at least one of the optical characteristic change members is arranged in the cladding of the optical fiber so as to contact a core of the optical fiber.

12. An optical bend measurement apparatus comprising:
a light source unit configured to supply measurement light;
an optical fiber configured to transmit the measurement light;
an optical characteristic changer provided at a part of the length of the optical fiber, the optical characteristic changer including optical characteristic change members provided at different positions in the circumferential direction of the optical fiber; and
a photodetection unit configured to detect light output from the optical fiber,
each optical characteristic change member imposing a change of optical characteristics on light impinging on the optical characteristic change member depending on a bend quantity in a specific direction of a portion of the optical fiber where the optical characteristic change member is provided, and
the photodetection unit detecting the light that has undergone the change of the optical characteristics to independently measure bend quantities in specific directions of the different portions of the optical fiber based on intensities of the detected light;
wherein at least one of the optical characteristic change members is arranged across a core and a cladding of the optical fiber.

13. The optical bend measurement apparatus according to claim 12, wherein the change of optical characteristics is a change imposed to the impinging light by each optical characteristic change member so that the impinging light becomes individually identifiable.

14. The optical bend measurement apparatus according to claim 12, wherein detection by the photodetection unit is performed after changing a way of propagation through one of reflection and transmission of light that has gone through the optical characteristic change members.

15. The optical bend measurement apparatus according to claim 12, wherein the optical characteristic change members absorb light of different wavelengths, respectively.

16. The optical bend measurement apparatus according to claim 12, wherein the optical characteristic change members convert the impinging light into light of wavelengths different from each other, respectively, and do not absorb the light of the converted wavelengths.

17. The optical bend measurement apparatus according to claim 12, wherein the light source unit supplies a wide wavelength band light including light components of wavelengths on which the optical characteristic change members impose changes of optical characteristics, respectively.

18. The optical bend measurement apparatus according to claim 12, wherein the light source unit supplies a composed light of light of wavelengths on which the optical characteristic change members impose changes of optical characteristics, respectively.

19. The optical bend measurement apparatus according to claim 12, wherein the light source unit time divisionally supplies light of wavelengths on which the optical characteristic change members impose changes of optical characteristics, respectively.

20. The optical bend measurement apparatus according to claim 12, wherein the photodetection unit includes a separating optical element configured to separate light output from the optical transmission body into light of wavelengths, and a photodetector configured to detect intensities of the light of the wavelengths separated by the separating optical element.

* * * * *